(12) United States Patent
Labriola, III et al.

(10) Patent No.: US 12,305,969 B2
(45) Date of Patent: May 20, 2025

(54) BLAST DESIGN

(71) Applicant: Orica International Pte Ltd, Singapore (SG)

(72) Inventors: Angelo Labriola, III, Melbourne (AU); Stuart Hawke, Melbourne (AU); Mateus Rocha, Melbourne (AU)

(73) Assignee: Orica International Pte Ltd, Singapore (SG)

( * ) Notice: Subject to any disclaimer, the term of this patent is extended or adjusted under 35 U.S.C. 154(b) by 36 days.

(21) Appl. No.: 18/006,190

(22) PCT Filed: Jun. 29, 2021

(86) PCT No.: PCT/AU2021/050689
§ 371 (c)(1),
(2) Date: Jan. 20, 2023

(87) PCT Pub. No.: WO2022/016207
PCT Pub. Date: Jan. 27, 2022

(65) Prior Publication Data
US 2023/0258442 A1  Aug. 17, 2023

(30) Foreign Application Priority Data

Jul. 23, 2020  (AU) .............................. 2020902571

(51) Int. Cl.
*F42D 3/04* (2006.01)
*E21C 39/00* (2006.01)

(52) U.S. Cl.
CPC ................ *F42D 3/04* (2013.01); *E21C 39/00* (2013.01)

(58) Field of Classification Search
CPC .................................. F42D 3/04; E21C 39/00
(Continued)

(56) References Cited

U.S. PATENT DOCUMENTS

| 4,245,865 A | 1/1981 | Ricketts et al. |
| 2012/0323495 A1 | 12/2012 | Zhou et al. |
| 2020/0250355 A1† | 8/2020 | Giltner |

FOREIGN PATENT DOCUMENTS

| CN | 111259517 A | 6/2020 | |
| WO | WO-2020163302 A1 * | 8/2020 | ............. E21C 37/16 |

OTHER PUBLICATIONS

"International Search Report and Written Opinion", issued by the Australian Patent Office, as International Searching Authority for PCT/AU2021/050689 on Sep. 6, 2021, 13 pages.
(Continued)

*Primary Examiner* — Samir Abdosh
(74) *Attorney, Agent, or Firm* — Kilpatrick Townsend & Stockton LLP (57) ABSTRACT

A process for improved blast design including the steps of: acquiring geological data about a blast site from multiple data sources; extracting one or more blastability labels from the geological data; mapping the blastability labels in two or three dimensions; designing a pattern of blast holes based on the mapping; designing explosive for each blast hole based on the blastability label for that blast hole; loading each blast hole in the pattern of blast holes with the designed explosive for that blast hole; and detonating the explosive. Also, a method of extracting valuable resources from an area using the process and a visualisation tool for blasting operations that displays data from the process.

18 Claims, 7 Drawing Sheets

(58) Field of Classification Search
USPC .......................................................... 102/312
See application file for complete search history.

(56) References Cited

OTHER PUBLICATIONS

Kecojevic et al. "3-D Visual Drill and Blast Design," Fragblast, 2003:7(3); 167-179.
Third-Party Submission for Australian Patent Application No. 2021311134, dated Sep. 11, 2023, 8 pages.
Third-Party Submission for Australian Patent Application No. 2021311134, dated Aug. 15, 2024, 7 pages.

\* cited by examiner
† cited by third party

BLAST DESIGN

CROSS REFERENCE TO RELATED APPLICATIONS

The present application is a U.S. National Stage of International Application No PCT/AU2021/050689, filed on Jun. 29, 2021, which claims priority to Australian Application No. 2020902571, filed Jul. 23, 2020, which are incorporated by reference herein in their entireties.

FIELD OF THE INVENTION

The present invention relates to the field of mining and in particular blasting. More particularly, the invention relates to a process for automated domaining of rock properties for blasting, and the automated recommendation of blast design parameters matched to those domains, to achieve a desired pre-defined outcome with a degree of certainty. The invention is useful for automation of field implementation of tailored blast designs and may involve visualisation of properties of an area to be mined.

BACKGROUND TO THE INVENTION

Mining is a significant economic endeavour that contributes significantly to the gross domestic product of many countries. Companies involved in mining seek to constantly improve mining efficiency from both an economic and environmental perspective.

An important element of many mining operations is blasting. Blasting is essential for dislodging material that is subsequently extracted and processed to recover minerals, precious metals, gemstones, and various other valuable materials. The fragments created from the blast naturally have a high degree of variability. Due to this variability, excavation equipment and mineral processing plants are set up to process various ranges of fragment sizes. Different combinations of blast parameters work best with specific types of rock mass depending on the characteristics of the rock. When such parameters are applied to rocks, different particle sizes are observed. To achieve economic and environmental efficiency optimal blasting processes are desirable. However, the current blast design processes are known to be sub-optimal due to a number of factors. One such factor includes poor characterisation of rock properties to fully inform a blast design. Another factor is the inability to characterise on a sufficiently fine scale for accurate blast design. Such poor characterisation can lead to excess or insufficient explosive usage. The use of excess explosive is wasteful, adding unnecessary time and cost to an operation. The use of insufficient explosives results in poor blasting outcomes and has a negative effect on downstream processing such as digging and crushing, also adding unnecessary time and cost to an operation.

There are also limitations in being able to implement existing processes in the required workflow time window. For example, one method employed to characterise rock for blasting may include the geological sampling and assaying of the rock. The time required to collect samples, dispatch to a lab, and perform the assay analysis, may exceed the available time as set by the mining schedule, meaning a blast must be detonated before the assay based characterisation is complete or available, resulting in poor rock characterisation of rock properties to inform a blast design.

It is typical for blast holes to be drilled on a fixed grid pattern with, say, 3 m to 12 m spacing between holes. The Engineer responsible for blast design will typically make a judgement about rock hardness based on assumptions made from site geology and existing geological models. Often, a blast pattern spacing and explosive is then selected to achieve the desired result for the hardest expected material and that explosive may be used across the entire blast to ensure there is no under-blasting. It is known from recent studies that this can result in significant excess energy being used. Put another way, significant lower energy was required so significantly less explosive could have been deployed, which means lower cost and lower environmental impact.

It is also the case that insufficient energy may be used. Blast Engineers design for the domains they determine from a geological model. Typically, they ensure they cover the hardest zones so as not to under-blast, however in reality the geological model can be a poor representative of the granularity of variation of rock hardness in a blast, therefore drill patterns and explosive charge requirements are often insufficient for particular blasts or areas within a blast.

Further, it is also the case that blast engineers may divide a blast into more than one domain based on the geological model. For example, a hard zone might have a drill pattern and/or explosive charge designed to produce higher energy while a soft zone would have a design producing lower energy. Or the same might apply in a blast containing ore and waste according to the geological model, where ore is required to be blasted with higher energy to produce finer fragmentation enabling downstream processing efficiency, while waste only needs to produce fragmentation suitable for efficient excavation and haulage away from the active mining area. Once again, the geological model can be a poor representative of the granularity of variation encountered in the rock, and thus lead to non-ideal blast designs being applied to the differing regions within the blast.

The blast design is often not adjusted in a systematic or automated way based on data gained from drilling and other sources. This may be because adequate tools do not exist that can effectively use available additional data, or that the data cannot be used quickly enough to meet the drill and blast cycle production time window.

Current techniques used in the mining industry mean that most blast designs are sub-optimal. Sub-optimal blast designs have a multiplier effect on total cost of mining operations. As a general indication, the cost of mining operations can be divided into three broad categories with the relative proportion of total cost being: drilling and blasting 5-10%; loading and hauling 15-25%; crushing and grinding 50-65%. Blasting is the cheapest place to influence the best overall outcome for a mining operation. By way of example, even if blasting cost increased by 50%, the resulting better fragmentation delivering, say, a 20% increase in dig rates and a 10% increase in plant throughput would more than offset the increased blasting cost by reducing overall total operating cost and driving throughput for increased ore to sell.

Apart from the benefits to improved blast design, an improved visualisation of the blast site and rock classification for blasting purposes may be useful for other related operations and activities within the mine.

By way of further background, the invention described below uses predictive models for determining blastability. These models are sometimes referred to as artificial intelligence or machine learning algorithms. There are essentially two types of learning models: supervised and unsupervised. Unsupervised learning is a type of machine learning technique used to draw inferences from datasets consisting of input data without response labels. The most common type of unsupervised learning method is cluster analysis, which is used for exploratory data analysis to find hidden groups or patterns in data. Supervised learning, on the other hand, requires a labelled training set to build a predictive model. Since most data sets available in the industry do not have a suitable categorical blastability index that can be used to label the samples, the invention relies on unsupervised learning to label an initial training set, which is then used in supervised learning models to predict blastability labels on new data, and subsequently predict recommended blast design parameters for achievement of optimal blast outcomes in the targeted rock mass.

SUMMARY OF THE INVENTION

In one form, although it need not be the only or indeed the broadest form, the invention resides in a process for improved blast design including the steps of:

acquiring geological data about a blast site from multiple available data sources;
extracting one or more blastability labels from the geological data;
mapping the blastability labels in two or three dimensions;
designing a pattern of blast holes based upon this mapping;
designing explosive placement within each blast hole based on the blastability label for that blast hole;
loading each blast hole in the pattern of blast holes with the designed explosive for that blast hole; and
detonating the explosive.

The blastability labels are identifiers for groups of similar samples in the dataset, according to any given criteria; that are either directly given or inferred from the given inputs, and subsequently used by the invention to design a blast, including its hole pattern and explosive charges. The blastability labels may also be referred to as blastability parameters.

Suitably the process is performed in two dimensions, that is to say, surface mapping. Alternatively, the process is performed in three dimensions, that is to say, including depth.

Suitably the method may include the further step of smoothing the mapping of labels to simplify the grouping of blastability labels within blast holes and between blast holes for the purpose of providing operational efficiency in the delivery of the designed explosives to the blast hole.

The steps of designing a pattern of blast holes and designing explosive for each blast hole are suitably interactive to achieve appropriate explosives in a suitable blast pattern for blast effectiveness.

Blast holes may be classified by blastability domain based upon available data inputs and the step of designing the required explosive or combination of explosives for each blast hole may be done by hole label or by intra-hole label (sub-domains within a hole).

In a further form, the invention resides in a visualization tool for blasting operations at a mine site, the visualization tool comprising:

a graphical user interface displaying an image of a blast area in the mine site that is able to be manipulated in multiple dimensions;
an overlay on the graphical user interface that displays blastability labels and rock properties; and
a user interface tool permitting manipulation of the graphical user interface and overlay to change one or more of: angle of view; zoom level; explosive type; blast hole spacing.

The blastability labels are suitably generated by the process of the first form of the invention.

In a yet further form the invention resides in a method of extracting valuable resources from an area including the steps of:

identifying an area known to contain valuable resources and designating the area or a part of the area as a blast area;
acquiring geological data about the blast area from multiple available data sources;
extracting one or more blastability labels from the geological data;
mapping the blastability labels in two or three dimensions;
designing a pattern of blast holes based on the mapping;
designing explosive placement within each blast hole based on the blastability label for that blast hole;
digging the pattern of blast holes;
loading each blast hole in the pattern of blast holes with the designed explosive for that blast hole;
detonating the explosive to achieve a designed outcome;
collecting the valuable resources and waste; and
separating the valuable resources from the waste.

By "valuable resources" is meant the target product of mining operations including metalliferous ore, coal, minerals and gems.

By "designed outcome" is meant an outcome in terms of blast product, such as fragmentation size, plant throughput, environmental outcomes, etc., that is desired for a given set of conditions as described herein.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in a process for improved blast design. Accordingly, the process steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
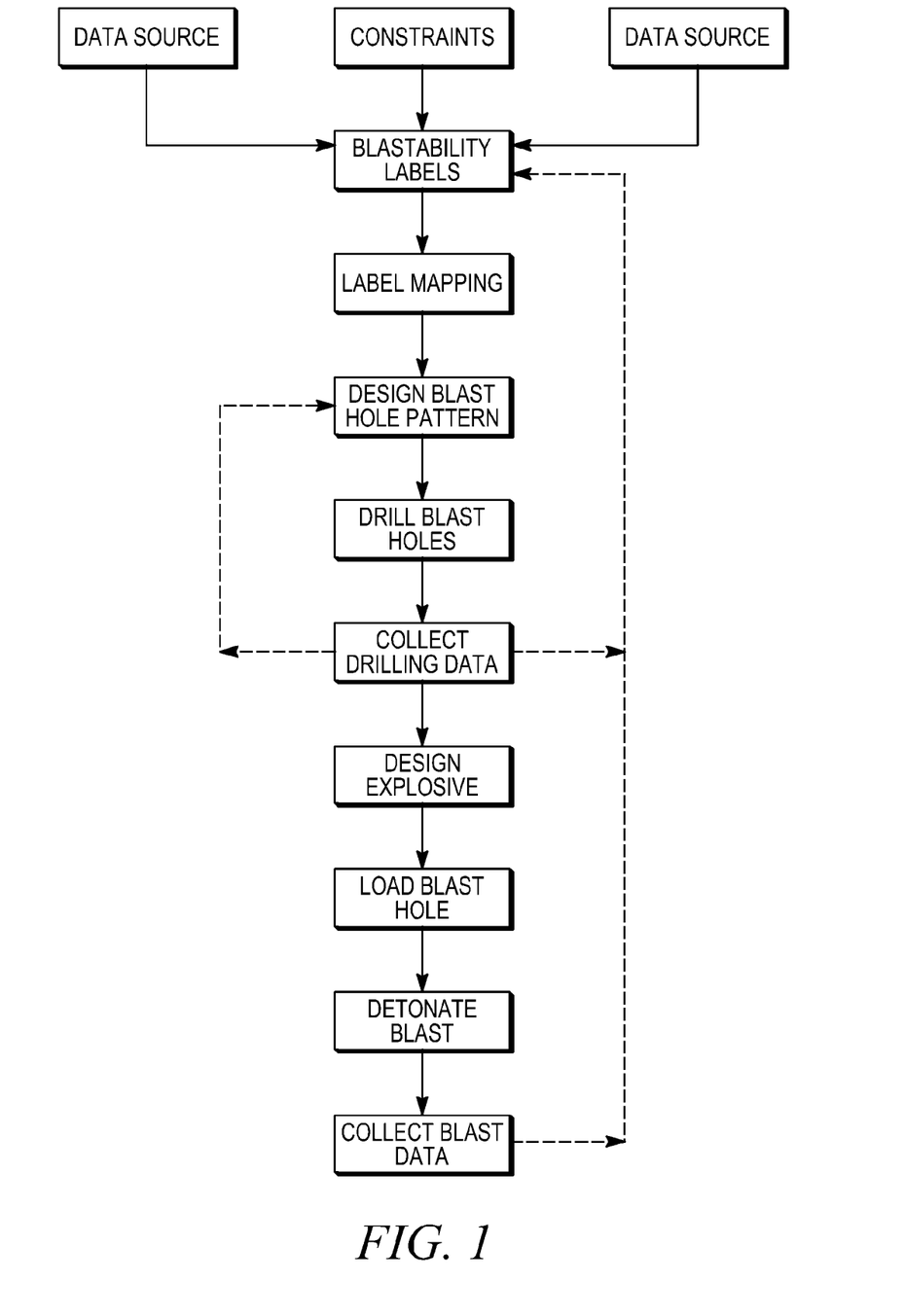
FIG. 1 is a flowchart of a process for improved blast design.

Referring to FIG. 1 there is shown a top-level flow chart of the process for improved blast design. Each step of the process is described in greater detail below. The process commences with acquisition of data and noting constraints. Various blastability labels are predicted from the data and these labels are mapped. Various additional processes may be employed to enhance the usability of the mapping, as described below. A blast hole pattern is then designed. The blast hole pattern is provided to drilling assets and further data is collected during drilling of each blast hole in the blast hole pattern. The drilling data may optionally be used to adjust the blast hole pattern of subsequent holes to be drilled during the course of drilling and may also be an additional source of data to adjust the blastability labels.

The explosives required are designed. Although this step is shown after the drilling of the blast holes, this is just for convenience of display. The blast explosive may be designed any time after prediction of the blastability labels. The explosive is loaded into the blast holes and the blast is detonated. Further data may be collected from the blast and fed back to the prediction of blastability labels. If the blast is conducted in phases the data from one phase may be used to adjust the explosive design for subsequent phases.

Looking now at the process in detail, there are various sources of data relevant to mine blasting operations. The data sources may include existing data sources currently used in mine operations, existing data sources not currently used in mine operations, and new data sources. For example, data sources may include geophysical measurements (conductivity, resistivity, magnetic susceptibility, etc.), mechanical properties used to infer hardness (drill rotation speed, weight on bit, pull down pressure, etc.) and physical measures of the hole (diameter variation, orientation/deviation, temperature, etc.). The inputs obtained from these data sources are used in the prediction and labelling of blastability domains across the blasting site, and can be used as proxy indicators for (but not limited to) physical properties of the rock mass such as hardness, rock type, brittleness, plasticity, strata variation, chemical composition, fracture/jointing (quantity of fracture sets, orientation, frequency, aperture), ore to waste ratio.

One existing source of data that is currently used is block model data. Block models are one type of data structure commonly used in the industry to represent and store geological data and models. It is a three-dimensional representation of the space, partitioned into several blocks of equal dimensions, called voxels. Each voxel is associated with a 3D location and various other values, which include (but may not be limited to) geological and geophysical aspects of the rock mass (e.g. readings of elements contained in it), properties derived from their studies or any other values inherent to that particular space. Block model data is representative of the geological properties for the rock mass, and is typically estimated using geostatistical methods such as kriging applied to the source geological data. It is in many occurrences, a bulk data source that does not have sufficiently fine granularity to take into account any variation in rock properties at a blast hole to blast hole level. Despite this limitation most blast design processes rely on block model data as an input because no other readily available data exists for use, or no method for effectively applying this data to inform blast design has existed. Other sources of data can include post drilling data such as gamma logging, gamma-gamma logging, and blast hole surveying.

One existing source of data that is not commonly used for blast design is drill machine sensor data. Most modern mining drills have sensors that record drill operating parameters such as speed of rotation, rate of advance, torque, force and pressure. From this data it is possible to determine or infer inputs to blastability such as hardness, brittleness and strata variation parameters. The data is obtained over the length of the drill hole so the blastability labels need not be a single label for the blast hole but a varying profile against depth. Drill sensor data is not commonly used because there may be variation from hole to hole or drill machine to drill machine due to measurement errors including input sensor failure, calibration issues, or inability to appropriately apply these measures as inputs to inform a process. More significantly, processes do not exist to utilize the available data in a timely manner within the available workflow window.

Apart from existing sources of data there are other data sources that can be employed. These include gamma ray logging. Gamma ray logging is useful for inferring chemical composition and determining rock strata variation. Another data source is sonic logging. Sonic logging can be used to determine rock texture and lithology from which porosity can be calculated. Other data sources include seismic while drill, neutron pulse logging, conductivity, gamma-gamma (density), magnetic resonance, caliper (blast hole wall surface variations), resistivity, water detection, temperature. The nature of these data sources will be familiar to persons skilled in the art.

Any constraints related to the implementation and execution of the blast design are also input to the prediction of recommended design parameters. For instance, only certain drill sizes may be available at a certain site, thus limiting the size of each drill hole and hence impacting the design of the explosive. There may also be constraints on the crushing capacity, meaning the blast must produce smaller rocks than if heavier crushing equipment is available. These constraints impact on the selection of training data that describes historical blasting success.

Data from the available sources are stored in an appropriate data store suitable for use with the machine learning algorithms employed as part of this invention. This may occur by direct user input or through digital systems integration. A user interface is provided for direct user input of data. The data is used to determine the initial blasting parameters, including blast pattern and explosives energy throughout the target blast area (or areas). An extension of this capability would also apply to blast initiation timing.

The blastability labels may also be determined according to observed blast outcomes, that is to say, the blast result. For example, a mine may have a history of fragmentation measurement data. This may be used in the invention to characterise the rock and inform blastability labels not just on the available geological properties but also on the historical outcomes, and allocate labels accordingly. The same might apply for digging productivity from the digging fleet, or a range of other outcomes such as but not limited to—downstream crusher and processing plant throughput, wall control measures such as wall movement, vibration into walls, etc., blast environmental outcomes such as vibration, air overpressure, fume, etc., ore displacement/dilution. Outcome data sources and actual or design blast loading histories can be used by the invention to domain rock based on targeted outcomes.

The factors outlined above are input through a user interface. For example, in the case of digging, a user might know that shovel type A will be available for the planned blast so they can direct the invention to calculate optimal parameters for shovel A (which may be smaller and have a lesser digging capability than shovel B). Or the user may wish to set constraints based on multiple parameters. For example, provide design that best meets an objective of Shovel A digging and target drill and blast cost of $X per unit volume or mass of rock.

A user interface also allows other constraints or variables to be entered, evaluated and used. For example, drill and blast cost might be a parameter such that the output of the invention calculates a pattern and explosive selection that best meets that constraint. Another example may be drilling capacity so that the output of the invention calculates a drill pattern that is practically able to be drilled with the equipment capacity on site as specified. A further example is available explosives and their energies for the target site, so that the output of the invention selects from the explosives available (even though it may alert users to better options that are available in the industry but perhaps not at that site) to provide options or the best option based on any defined parameters.

By associating an energy or powder factor required to the blasting domain, the invention uses the input data and these parameters to calculate the recommended drill pattern and explosives selection. The invention provides this as an output of design per domain (blastability label) for use in a drill and blast design application to lay out blast holes based on additional more specific geospatial data input (for example, surveyed variation of bench floor levels affecting target hole depths, or, uneven blast faces that require manipulation of front row blast holes to meet the profile without over-burdening individual holes (poor fragmentation), or under-burdening individual holes (risk of uncontrolled ejection fly-rock from the blast face).

Figure 2:
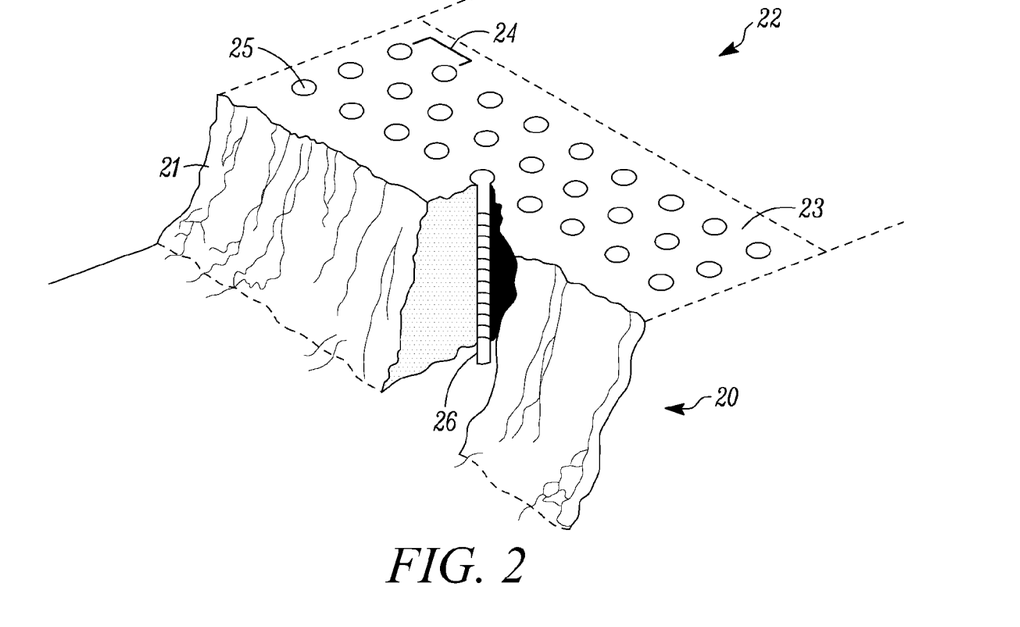
FIG. 2 is a schematic of a blast area.

The blastability labels obtained are recorded against location. The location is a three-dimensional location referenced to a datum. The datum may be relative, such as the first point of contact of a drill in a current drilling programme, or absolute, such as latitude, longitude and height above sea level. A typical example is shown in FIG. 2. The blast area 20 indicates the blast face 21, blast hole pattern 22, rock to be blasted 23 and blast hole spacing 24. The location of each drill hole 25 and the blastability parameters obtained from the drill hole are recorded by depth 26. The mapped blastability parameters are used to design the blast hole pattern and the explosive.

Figure 3:
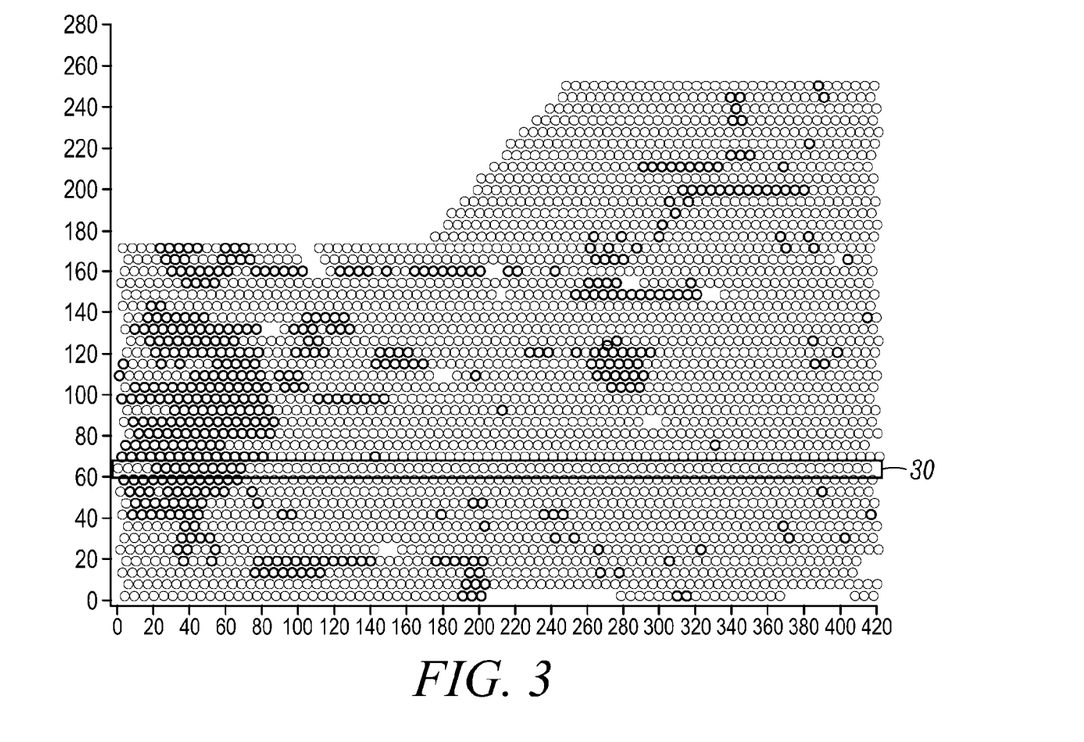
FIG. 3 shows a plan view of a blast site within a mine showing drill holes.
Figure 4:
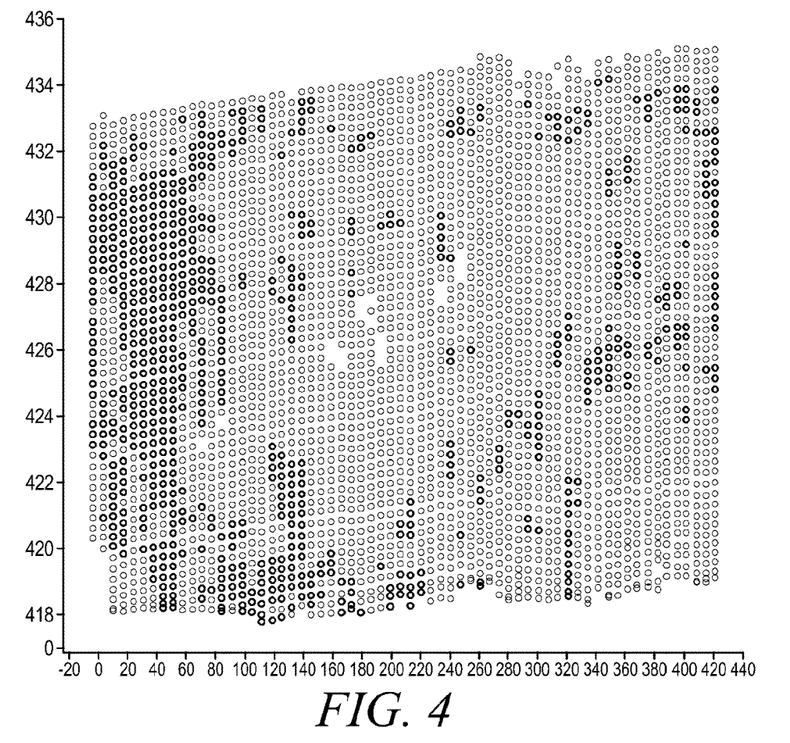
FIG. 4 shows a depth cross-section of the blast site of FIG. 3.

The data may optionally be displayed in a useful manner, for example by colour-coding. Display of the blastability label map is not essential for calculation of blast pattern and explosive, but may be useful for various people associated with the blasting operations. By way of example, FIG. 3 shows a plan view of a site showing drill holes coloured according to hardness with red being hardest and green being less hard. The colours and shading in between represent gradations from medium soft through to medium hard. FIG. 4 shows a depth cross-section taken in the box 30 of FIG. 3. As displayed in FIG. 3 and FIG. 4, there is significant variation in hardness both in extent and depth. FIG. 3 shows x and y in meters from an arbitrary datum. FIG. 3 shows the same x-axis with depth in meters on the y-axis. The visualization tool of the invention includes a user interface that allows users to filter by elevation so as to view horizontal slices from top to bottom of the blast area with domaining for each slice.

The hardness descriptor displayed in FIG. 3 and FIG. 4 shows that selection of the same explosive for each drill hole is inefficient and wasteful. Selection on a hole by hole basis would result in the use of less explosive and a better blast outcome. However, the effort required to implement the design explosive for each individual blast hole may not be operationally efficient and cost effective in some situations. The inventors have therefore determined a smoothing procedure to minimize the variation between and within holes and create logical groupings of blastability labels. This is displayed in the screen shots of FIG. 5 and FIG. 6.

Figure 5:
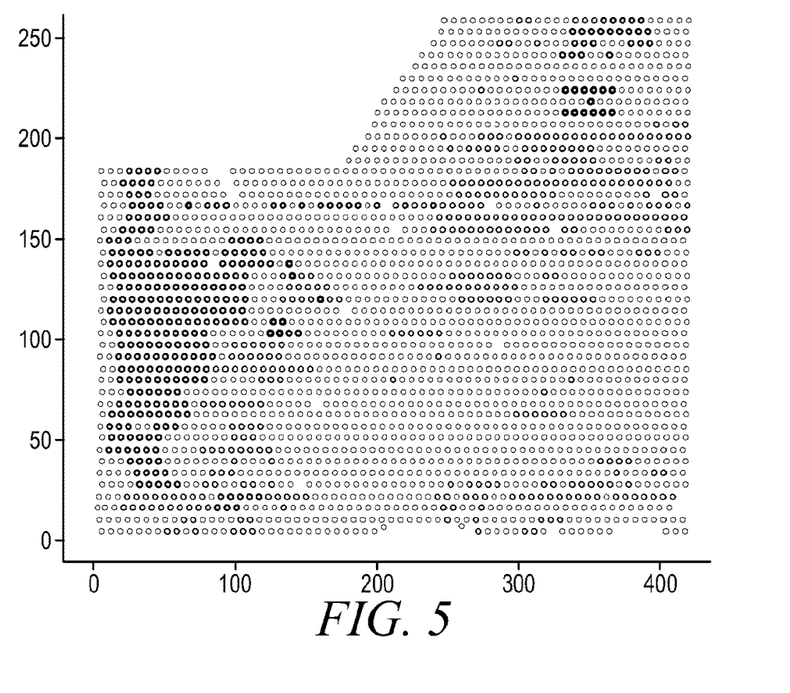
FIG. 5 shows the data of FIG. 3 after a first level of smoothing.
Figure 6:
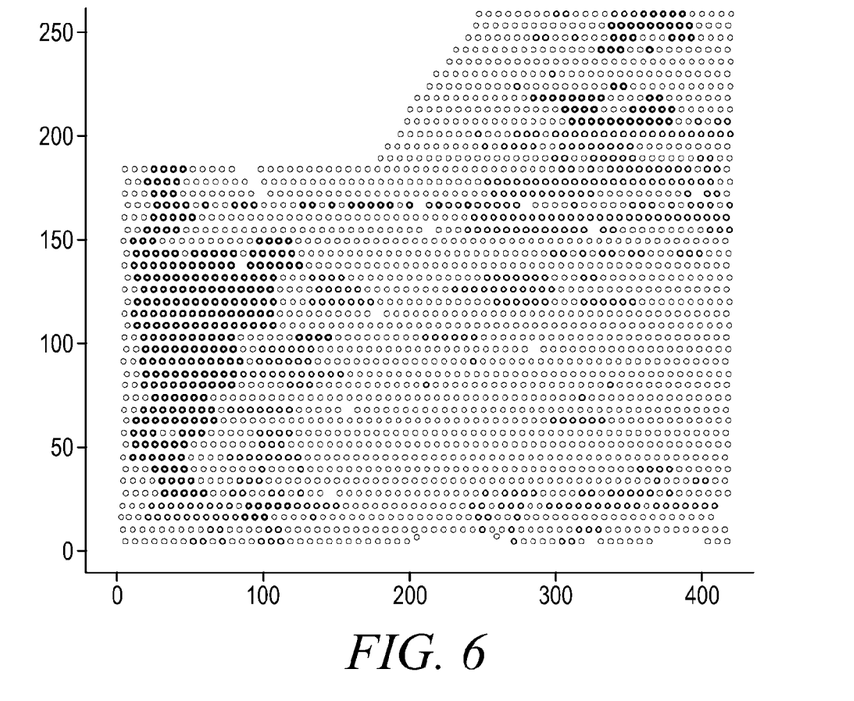
FIG. 6 shows the data of FIG. 5 after a second, optional, level of smoothing.

FIG. 5 is the same blast site as shown in FIG. 3 with hardness classified according to a five-point scale but smoothed to a three-point scale to remove complex groupings of blastability labels. FIG. 6 shows the same map after application of an increased degree of smoothing algorithm. The choice of applying a higher degree of smoothing depends on the level of trade-off the blasting engineer is willing to accept. Ease of field implementation with less product changes between holes versus accurately applying the appropriate energy per hole to achieve the result irrespective of the ease to execute the blast design.

Figure 7:
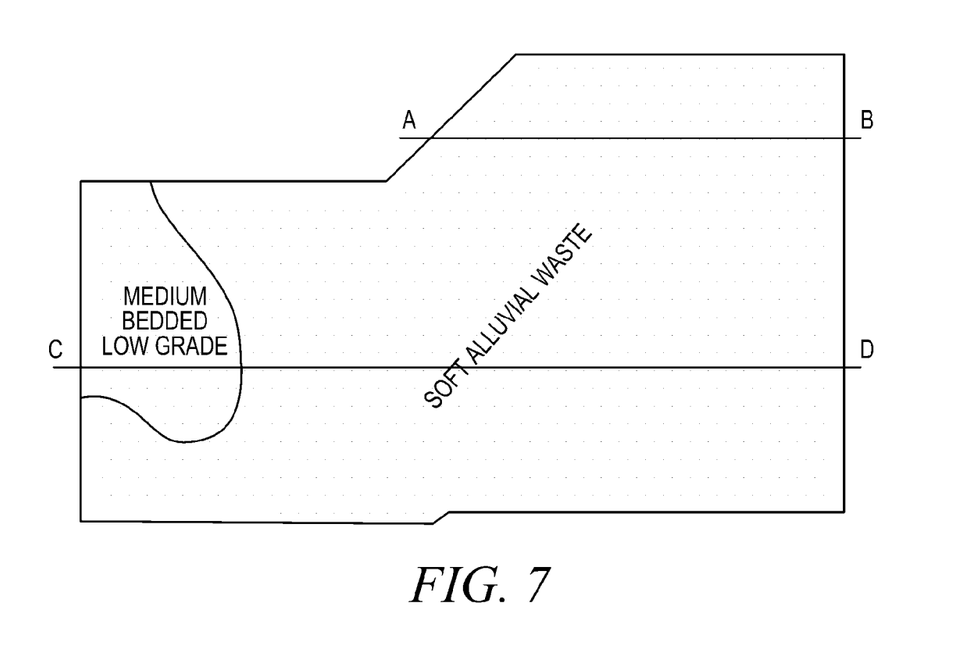
FIG. 7 is a prior art rock hardness map of the area shown in FIGS. 3 to 6.

Even with two levels of smoothing, the variation in hardness across the blast site is still significant compared to the geological hardness map depicted in FIG. 7 which is determined using the geological model as a reference. The geological model is based on interpolation between actual data from exploration holes that are spaced significant distances apart. The map in FIG. 7 is typical of the prior art blastability parameters on which current blast design is based. As can be seen in FIG. 7, there are only two domains identified.

The invention employs a combination of fuzzy logic and moving averages to smooth resultant blastability labels both across multiple holes and also within holes. Other known smoothing techniques would also be suitable.

Use of the algorithm with smoothing applied shows that the blastability labelling based on high spatial density data from hole profile measurements enhances the understanding of the rock mass for blasting purposes. The labelling using the algorithm produces a higher fidelity and more accurate representation of blasting domains. The blasting domains are then associated with explosives designs per hole.

Thus, the process outlined above offers significant opportunity for improved blasting outcomes, even just using hardness data. Even more significant improvements are obtainable when all available data sources are exploited.

Once the map of blastability labels is generated, it may be used for blast design. This involves the locating of blast holes and the selection of explosive for each blast hole. Typically, blast holes are drilled on a simple grid pattern to cover the blast site. However, the detailed information available in visualization of FIG. 6 means that additional blast holes may be drilled in harder material or fewer blast holes drilled in softer material. This can be particularly important for control of the size of material post blast. A very large mine site with large excavation equipment is able to load and haul heavy rocks and therefore fewer blast holes may be needed. A mine site with smaller excavation equipment will want to design a blast that results in smaller rocks. A blast that produces large rocks may require secondary blasting in order to break large rocks into a size that can be loaded by the excavation equipment. The process outlined herein avoids this cost by enabling design of a blast that produces rocks below a given size limit without using excessive explosive in areas that have lower hardness.

Data collected while drilling may be used to modify the blast hole pattern for subsequent drilled holes. If drilling data indicates a significant departure from the predicted blastability labels the blast hole pattern spacing may be adjusted appropriately. The drilling data also becomes a dynamic data source for prediction and re-prediction of blastability labels. This may be used to adjust explosive design to enhance the blast outcome even without the adjustment of the drill pattern. Specifically, data from typical MWD (measure while drilling) systems provide data that the invention may use to determine blastability labels through unsupervised machine learning based on mechanical specific energy. The invention provides this labelling at intervals as closely spaced as the blast hole source data and can be as low as 1 cm intervals. As the holes are now drilled and their position is fixed, the algorithm recommends the required energy per hole and within the hole to achieve the specified blasting outcome.

Even if conventional grid blast patterns are employed, the ability to tailor the explosive for each blast hole offers significant economic and environmental advantage.

Since the usage environments and the data sources may vary from site to site, the following are the general configurations that are expected. Other variants are also possible.

- Site commences the use of the invention with geological and/or geophysical data and possibly outcome data to determine blastability labels for drilling.
- These labels inform the blast hole spacing to be drilled based upon the recommended energy factor predicted via the use of the invention.
- Upon ingestion of drill (MWD) data the domains are updated to take into account fixed positions of blast holes and more granular information available from the MWD data set;
- Site commences the use of the invention with MWD drilling data, with no outcome specification data available to the invention. Upon ingestion of the MWD data, blastability labels are predicted on the basis of a calculation of mechanical specific energy and a range of required explosives energy is predicted across the blastability labelled domains;
- Site commences the use of the invention with MWD drilling data and with outcome specification data and blasting energy history. Also, geological and/or geophysical data where available. Upon ingestion of the data, blastability labels are created and required explosive energy predicted to produce targeted blast outcomes, and tailored design parameters recommended to achieve said required energies.

The above describes MWD from drill systems as the data source of down hole profiles. The invention is not limited to the use of this data source for blast hole profile information. Other sources such as Seismic while Drill sensor data, geophysical measurements such as and not limited to gamma or gamma-gamma logging, resistivity logging, conductivity logging, magnetic susceptibility logging, temperature logging, water level and condition logging, geochemistry logging, and physical logging parameters such as deviation and hole diameter variation. Such data is also able to be used by the invention to classify and predict blastability labels with additional or more appropriate data sources to the target application.

Since initial blastability labelling can provide explosives energy allocation that is impractical to apply in the field, a smoothing element is applied to the algorithm. The purpose is to both obtain a granular domaining of the rock for blasting purposes to apply energy where it is required for the target outcome, and also to ensure that the chosen energy allocation can be practically managed in the field.

Once the blast hole pattern and explosive are designed the explosive is loaded to each blast hole in the conventional manner and the blast is detonated. Data may be collected from the blast and used to refine the prediction of future blastability labels and recommended design parameters. Machine learning techniques are employed so that determination of blastability labels characterizing the rock improves after each blast, and the training set defining successful blasts increases, and the determination of recommended design parameters also improves.

Finally, the actual blast data for the as-loaded holes is extracted to the data store. This may be by file transmission means however preferably through integration of data via means of APIs or similar. The blast data is then available as a history of data, to be combined with outcome measurement data related to the blast from the integration of post blast performance measurement systems. Examples include and are not limited to fragmentation measurement systems, digging productivity data systems, crushing and processing plant performance systems, pit wall measurement systems, vibration and/or air overpressure measurement systems, fume measurement systems, etc.

By way of example, three processes are described. The first process is bootstrapping from historical data. In this case the invention is prepared for use for the first time, or re-trained with more current data. It consists of partitioning the blast area into domains with characteristic or predominant identified hardness or blastability and using this information to label the dataset, create an effective training set, and train a predictive model. The steps are:

- The user inputs all available information about logged blasts;
- The invention filters out blasts that do not meet the proposed success criteria;
- The invention identifies hardness or blastability labels using Unsupervised Learning on MWD data;
- The labelled domains are matched with the block model's voxel centroids;
- A regression model is trained with the labelled block model observations;
- A regression model is trained with the labelled MWD observations.

The step of identifying domains uses a clustering technique called K-means, although other clustering methods and algorithms can be employed. This is a type of unsupervised learning to classify data points into at most K groups according to rock type. The technique works iteratively to assign each data point to one of K groups based on features provided. Data points are clustered based on feature similarity. As noted in the figures, the invention uses K=5 as an example. That is to say, rock classification of soft, medium soft, medium, medium hard and hard. Note however, the appropriate number of groups (K) will be determined by assessing the variance as a function of the number of clusters (for example through the use of an elbow test)

Once the initial training is complete and blastability labels are determined, it is possible to create test sets for three varieties of supervised predictive models:
Predict blastability from block model data;
Predict blastability from MWD data;
Predict blastability from a combination of MWD data and block model data.

A first scenario is to predict rock hardness or blastability labels from new block model information and use it to recommend effective drill pattern settings (burden and spacing parameters for the entire blast). The steps are:
The user provides a polygon delineating the area where they want to design the blast, along with other required blast parameters and/or constraints (e.g. bench height, bit diameters, available explosives and their densities and relative weight strengths);
The invention isolates the area of the block model (or available geological information) that falls into to the provided polygon (on all 3 coordinates);
The invention uses the trained predictive model on the selected block model data to make a rough prediction of rock hardness domains for the selected area;
The invention recommends a burden and spacing for the entire drill pattern based on the obtained rock hardness and provided gear and material information.

The second scenario is to improve rock hardness or blastability classification of the domains by leveraging the newly obtained MWD data, and to use the refined model to recommend appropriate energy factors. This is necessarily performed after the blast holes are drilled.
The User drills the holes and uploads the MWD data into the system;
The invention uses the trained predictive model on the new MWD data to predict improved rock hardness or blastability labels for the drill pattern;
Energy factors are matched from the obtained hardness or blastability labels and available products using closed formulas and recommended to the user;
The customer charges and executes the blast;
The customer inputs post-blast information to the system;
The invention applies the success criteria to decide whether this blast was successful or not. If positive, the blast is added to a pool of successful blasts used to retrain the classification model sporadically. If negative, the blast is not used for training purposes but the information is kept regardless in case the success criterion is changed.

A suitable supervised predictive model (although other supervised learning techniques can be employed) for the third scenario is the Random Forest Regressor. It is a regression algorithm consisting of many decision trees. It uses bagging and feature randomness when building each individual tree to try to create an uncorrelated forest of trees whose prediction by committee is more accurate than that of any individual tree.

This method was chosen not only because it typically yields good results for relatively small-to-medium sized datasets (such as the ones typically found in the industry) but also because it consists of several decision trees. That means one could interpret its results further to better understand the rules that led to any classification, which in turn builds confidence in the model.

To recommend a burden and spacing, the invention first determines a Tentative Target Energy Factor (TTEF). This is an energy factor that characterises the blast as a whole. To determine this value, the rock blastabilities predicted from the block model alone are analysed and their mean rounded up to the nearest energy factor found amongst the available blasting products is considered. It also bases the calculations on the Relative Weight Strength (RWS) and density of a mid-range blasting product; that is, it calculates the burden and spacing as if the product with an RWS lying near the mean of the available RWSs was used throughout the whole blast. The rationale behind this choice is to allow room for adjusting the design by choosing a higher or lower energy factor for specific holes, if necessary. Drill bit diameter and bench height are inputs from the user, defined beforehand depending on equipment and drills used.

The following parameters are used:
Drill Bit Diameter (m)=d
Bench Height (m)=BH
Tentative Target Energy Factor (MJ/m$^3$)=ttef
RWS$_{ANFO}$=100
Mid-Range Product RWS (no unit)=rws
Mid-Range Product Density (kg/m$^3$)=mrd The following calculations are used, however other accepted blast design rules of thumb can and are adopted to derive design parameters for achieving the Tentative Target Energy Factor predicted:

| | Abbrv. | (Formulated) Rule of Thumb |
|---|---|---|
| Burden (m) | B | $\sqrt{\dfrac{HV}{1.1547005 * BH}}$ |
| Spacing (m) | S | B * 1.1547005 |
| Subdrill (m) | SD | 4.25 * d |
| Hole Volume (m3) | HV | $\dfrac{CW}{PF}$ |
| Stem Height (m) | SH | 25 * d |
| Charge Length (m) | CL | BH + SD − SH |
| Charge Weight (kg) | CW | $CL * \pi * \left(\dfrac{d}{2}\right)^2 * mrd$ |
| Powder Factor (kg/bcm) | PF | $\dfrac{ttef}{\left(\dfrac{rws}{RWS_{ANFO}}\right) * 2.3}$ |

Figure 8:
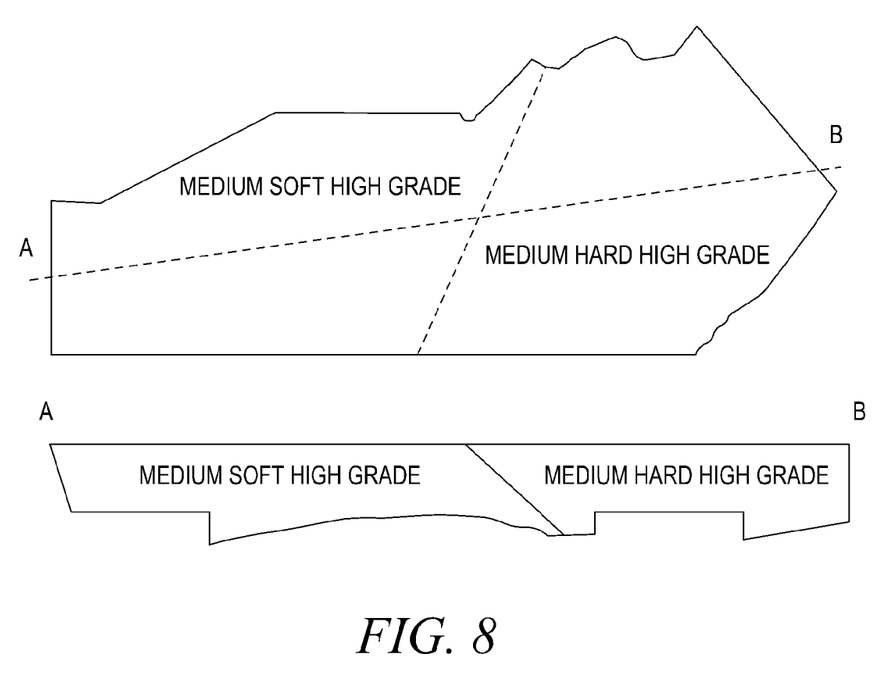
FIG. 8 demonstrates hardness classification based on conventional site geology.
Figure 9:
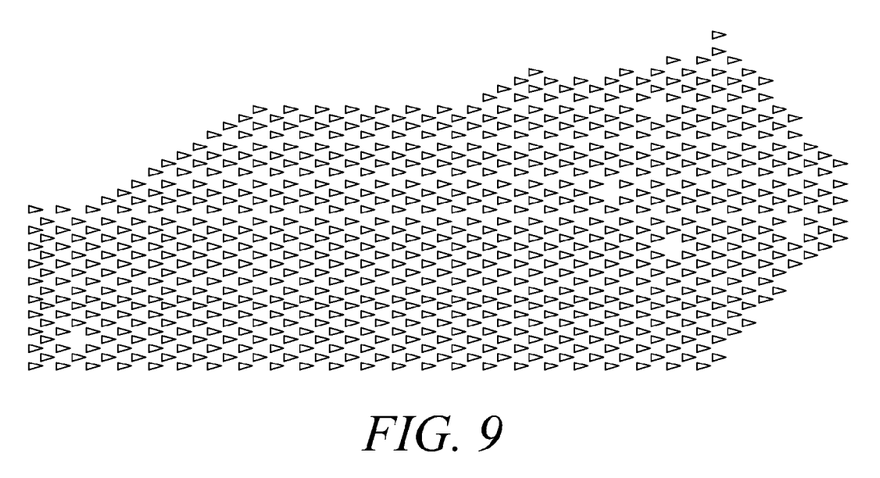
FIG. 9 demonstrates an application of the invention for hardness classification.

In order to exemplify the benefits of the process, an example is given of explosive selection based on conventional site geology compared to hole-by-hole classification and blastability labelling. As can be seen in FIG. 8, the image represents manual interpretation domaining based on the geological model, in plan (top) and cross section (bottom). The image of FIG. 9 represents hardness domaining for this blast based on application of the invention. Whilst similarities can be inferred between the two methods, the outcome from application of the inventions is more granular at the blast-hole level. In practice, the classification in FIG. 9 uses a colour coding with soft being depicted in blue and hard depicted in red. Different colours between blue and red depict different hardness on a much finer scale than is possible in the process of FIG. 8.

Figure 10:
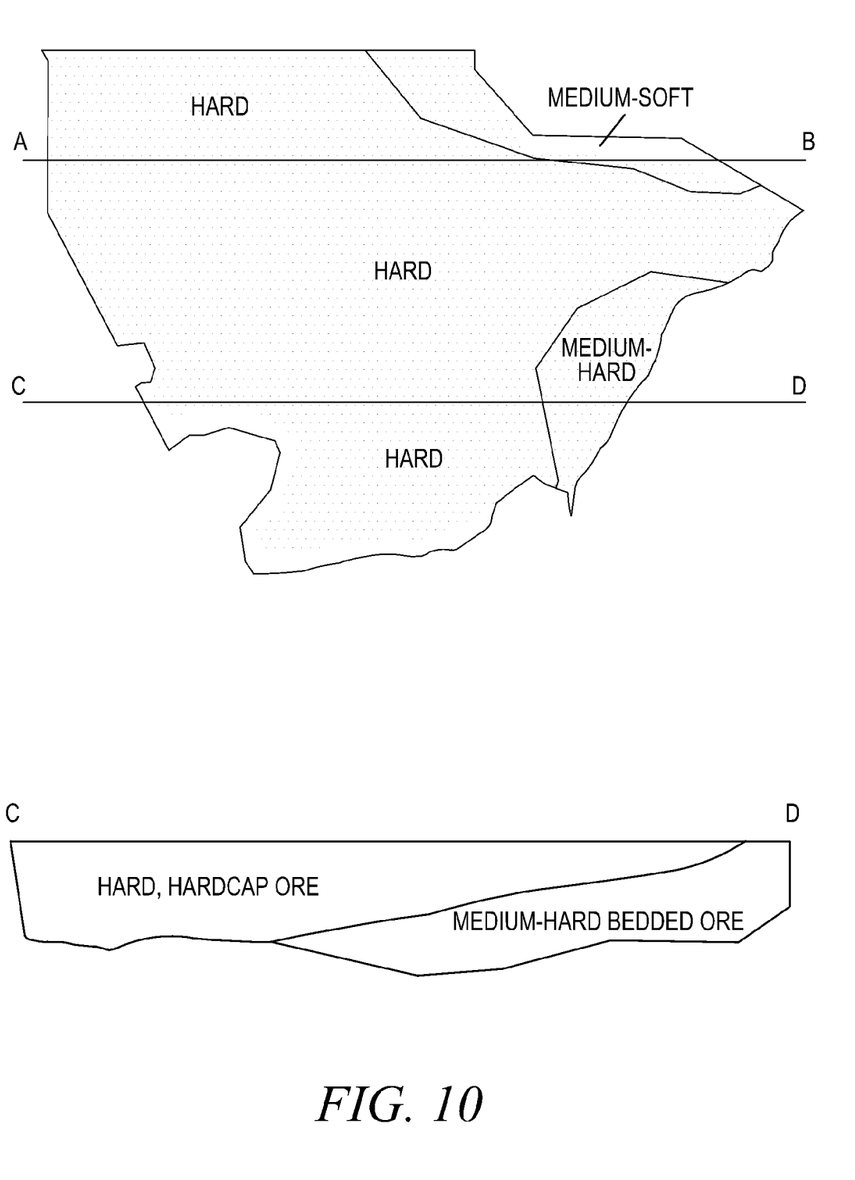
FIG. 10 is a further demonstration of hardness classification based on conventional site geology.
Figure 11:
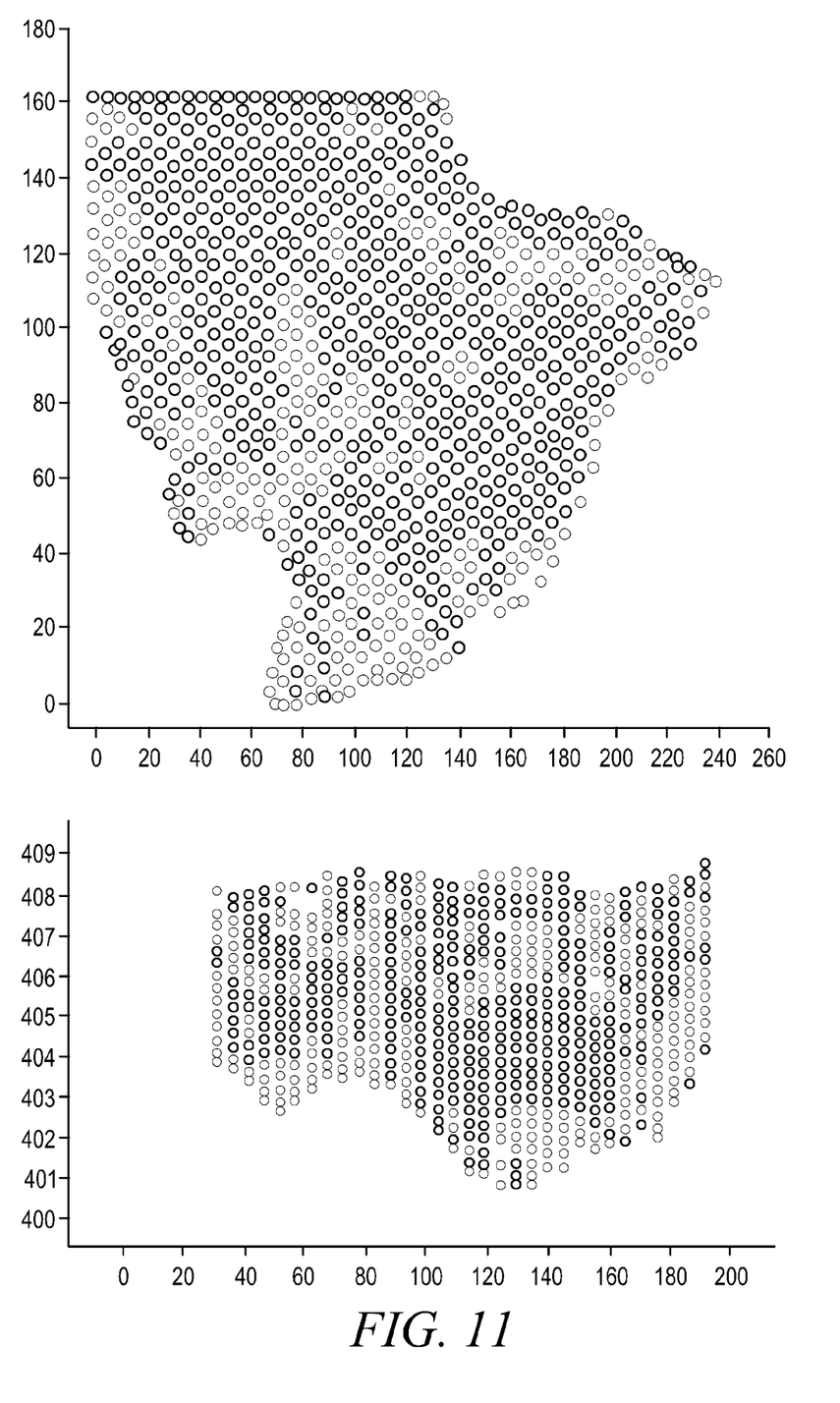
FIG. 11 is a further demonstration of an application of the invention for hardness classification.

FIG. 10 and FIG. 11 show a further example of the application of the invention. In FIG. 10 is shown a plan view (left hand side) of domaining based on a geological model. In this case a regular hole pattern is overlaid. The depth profile through the line CD is shown on the right hand side. The domaining is very simple with a large region identified as "hard" and two smaller regions identified as "medium-soft" and "medium-hard". By contrast, the domaining according to the invention is shown in FIG. 11. The plan view is shown on the left hand side and a depth profile at CD is shown on the right hand side. The hardness at each drill site is depicted according to a colour code, in this example ranging from green (softest) to red (hardest). The colour variation from green to red provides more detailed domaining than is demonstrated in FIG. 10.

The process outlined above offers multiple advantages compared to existing blast planning approaches. These include: automated improvement of drill and blast design process; reduced outcome variability; increased excavator productivity; improved particle size distribution; increased ore throughput; reduced power consumption (comminution); reduced mining and processing cost; and increased mining & processing profit.

There are also benefits to having the unique hole-by-hole designs digitally and effectively transmitted to the field operations and in particular the drilling machine and explosives loading truck (also known as the Mobile Manufacturing Unit—MMU), so that the designs can be efficiently and automatically executed in the field. Critical adjacency is useful as it is operationally difficult, if not impossible, to produce unique designs on a hole by hole basis without an effective method of greater automation for executing those designs in the field through explosives delivery systems.

The invention described herein provides improved workflow, enhanced user experience and time savings. Specifically, the output of the invention can provide the blast pattern by domain, and the invention aspect related to the design application would ingest those parameters and do the following:

Automatically apply the different patterns within the blast area;
Automatically adjust blast holes for the edges of the boundaries or other such conditions;
Automatically adjust blast hole positioning at the intersections of the pattern domains within a blast area such that it remains practical to navigate and safely work on bench with blast holes arranged such that the MMU can navigate through the pattern to load explosives without presenting holes laid out in a manner that does not allow for this practical consideration.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A process for improved blast design including the steps of:
    acquiring geological data about a blast site from multiple data sources;
    extracting one or more blastability labels from the geological data;
    mapping the blastability labels in two or three dimensions;
    designing a pattern of blast holes based on the mapping;
    designing explosive placement for each blast hole based on the blastability label for that blast hole;
    loading each blast hole in the pattern of blast holes with the designed explosive for that blast hole; and
    detonating the explosive,
    further including smoothing the mapping of labels to simplify the grouping of blastability labels within blast holes and between blast holes.

2. The process of claim 1 wherein the multiple data sources are selected from:
    geophysical measurements such as conductivity, resistivity and magnetic susceptibility;
    mechanical properties such as drill rotation speed, weight on bit, and pull down pressure;
    and physical hole measurements such as diameter variation, orientation/deviation and temperature.

3. The process of claim 1 wherein the step of extracting one or more blastability labels from the geological data is done by machine learning.

4. The process of claim 1 wherein the step of designing a pattern of blast holes based on the mapping includes optimising the pattern of blast holes for efficacy of blast.

5. The process of claim 1 wherein the process is recursive with data from the step of detonating the explosive being used in the step of acquiring geological data.

6. The process of claim 5 further including the step of extracting data from the step of detonating the explosive to a data store for further analysis.

7. The process of claim 1 further including a step of a user inputting available data through a user interface.

8. A visualization tool for blasting operations at a mine site, the visualization tool comprising:
    a graphical user interface displaying an image of a blast area in the mine site that is able to be manipulated in multiple dimensions;
    an overlay on the graphical user interface that displays blastability labels and rock properties; and
    a user interface tool permitting manipulation of the graphical user interface and overlay to change one or more of: angle of view; zoom level; explosive type; blast hole spacing, wherein the user interface tool permits a user to view a horizontal slice of a blast area.

9. A visualization tool for blasting operations at a mine site, the visualization tool comprising:
    a graphical user interface displaying an image of a blast area in the mine site that is able to be manipulated in multiple dimensions;
    an overlay on the graphical user interface that displays blastability labels and rock properties; and
    a user interface tool permitting manipulation of the graphical user interface and overlay to change one or more of: angle of view; zoom level; explosive type; blast hole spacing,
    wherein the user interface tool permits a user to view variation by depth in a cross-section of a blast area.

10. A method of extracting valuable resources from an area including the steps of:
    identifying an area known to contain valuable resources and designating the area or a part of the area as a blast area;
    acquiring geological data about the blast area from multiple available data sources;
    extracting one or more blastability labels from the geological data;
    mapping the blastability labels in two or three dimensions;
    designing a pattern of blast holes based on the mapping;

designing explosive placement within each blast hole based on the blastability label for that blast hole;

digging the pattern of blast holes;

loading each blast hole in the pattern of blast holes with the designed explosive for that blast hole;

detonating the explosive to achieve a designed outcome;

collecting the valuable resources and waste; and separating the valuable resources from the waste, further including the step of transmitting the pattern of blast holes to an excavation machine to automatically drill the pattern of blast holes.

11. A method of extracting valuable resources from an area including the steps of:

identifying an area known to contain valuable resources and designating the area or a part of the area as a blast area;

acquiring geological data about the blast area from multiple available data sources;

extracting one or more blastability labels from the geological data;

mapping the blastability labels in two or three dimensions;

designing a pattern of blast holes based on the mapping;

designing explosive placement within each blast hole based on the blastability label for that blast hole;

digging the pattern of blast holes;

loading each blast hole in the pattern of blast holes with the designed explosive for that blast hole;

detonating the explosive to achieve a designed outcome;

collecting the valuable resources and waste; and separating the valuable resources from the waste, further including the step of transmitting the explosive placement to an explosive loading truck to automatically load explosives according to the explosives placement.

12. A method of extracting valuable resources from an area including the steps of:

identifying an area known to contain valuable resources and designating the area or a part of the area as a blast area;

acquiring geological data about the blast area from multiple available data sources;

extracting one or more blastability labels from the geological data;

mapping the blastability labels in two or three dimensions;

designing a pattern of blast holes based on the mapping;

designing explosive placement within each blast hole based on the blastability label for that blast hole;

digging the pattern of blast holes;

loading each blast hole in the pattern of blast holes with the designed explosive for that blast hole;

detonating the explosive to achieve a designed outcome;

collecting the valuable resources and waste; and separating the valuable resources from the waste, wherein the method is recursive with data from monitoring the extraction of valuable resources over time being used in the step of acquiring geological data.

13. A process for improved blast design including the steps of:

acquiring geological data about a blast site from multiple data sources;

extracting one or more blastability labels from the geological data;

mapping the blastability labels in two or three dimensions;

designing a pattern of blast holes based on the mapping;

designing explosive placement for each blast hole based on the blastability label for that blast hole;

loading each blast hole in the pattern of blast holes with the designed explosive for that blast hole; and detonating the explosive, wherein the process is recursive with data from the step of detonating the explosive being used in the step of acquiring geological data.

14. The process of claim 13 further including extracting data from the step of detonating the explosive to a data store for further analysis.

15. The process of claim 13 wherein the multiple data sources are selected from: geophysical measurements such as conductivity, resistivity and magnetic susceptibility; mechanical properties such as drill rotation speed, weight on bit, and pull down pressure; and physical hole measurements such as diameter variation, orientation/deviation and temperature.

16. The process of claim 13 wherein the step of extracting one or more blastability labels from the geological data is done by machine learning.

17. The process of claim 13 wherein the step of designing a pattern of blast holes based on the mapping includes optimising the pattern of blast holes for efficacy of blast.

18. The process of claim 13, further including a user inputting available data through a user interface.

* * * * *

UNITED STATES PATENT AND TRADEMARK OFFICE
CERTIFICATE OF CORRECTION

| | | |
|---|---|---|
| PATENT NO. | : 12,305,969 B2 | Page 1 of 1 |
| APPLICATION NO. | : 18/006190 | |
| DATED | : May 20, 2025 | |
| INVENTOR(S) | : Angelo Labriola et al. | |

It is certified that error appears in the above-identified patent and that said Letters Patent is hereby corrected as shown below:

On the Title Page

Item (12)
Delete "Angelo Labriola, III" and insert --Angelo Labriola--

Item (72) Inventors
Please replace "Angelo LABRIOLA, III, Melbourne (AU);" with --Angelo LABRIOLA, Melbourne (AU);--

Signed and Sealed this
Fifteenth Day of July, 2025

Coke Morgan Stewart
*Acting Director of the United States Patent and Trademark Office*